(12) United States Patent
Bougard

(10) Patent No.: US 8,611,465 B2
(45) Date of Patent: Dec. 17, 2013

(54) DIGITAL RECEIVER FOR REACTIVE RADIO

(75) Inventor: Bruno Bougard, Carnieres (BE)

(73) Assignees: IMEC, Leuven (BE); Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/304,127

(22) Filed: Nov. 23, 2011

(65) Prior Publication Data

US 2012/0243645 A1    Sep. 27, 2012

Related U.S. Application Data

(63) Continuation of application No. 12/271,665, filed on Nov. 14, 2008, now abandoned, which is a continuation of application No. PCT/EP2007/054770, filed on May 16, 2007.

(30) Foreign Application Priority Data

May 16, 2006   (EP) ..................................... 06114056
Oct. 18, 2006   (EP) ..................................... 06122533

(51) Int. Cl.
   *H03K 9/00*   (2006.01)
(52) U.S. Cl.
   USPC ............. 375/316; 365/200; 327/544; 710/64; 455/553.1
(58) Field of Classification Search
   USPC ........... 327/544; 365/200; 375/130, 219, 260, 375/340, 341; 455/127.1
   See application file for complete search history.

(56) References Cited

U.S. PATENT DOCUMENTS

| 6,104,937 | A | 8/2000 | Fujimoto |
| 6,978,149 | B1 | 12/2005 | Morelli et al. |
| 7,200,166 | B1* | 4/2007 | Miao .............................. 375/219 |
| 2003/0063691 | A1* | 4/2003 | Shiozawa et al. ............. 375/340 |
| 2003/0067898 | A1* | 4/2003 | Challa et al. .................. 370/335 |
| 2005/0064829 | A1* | 3/2005 | Kang et al. ................. 455/127.1 |
| 2006/0093023 | A1* | 5/2006 | Brown et al. ................. 375/219 |
| 2009/0041143 | A1* | 2/2009 | Yamasaki ..................... 375/260 |
| 2010/0135358 | A1* | 6/2010 | McCorkle ..................... 375/130 |

FOREIGN PATENT DOCUMENTS

| EP | 1650876 | A1 | 4/2006 | |
| EP | 1650876 | A1 * | 4/2006 | ............... H04B 1/16 |
| EP | 1328066 | B1 | 1/2007 | |
| EP | 1328066 | B1 * | 1/2007 | ............... H04B 1/16 |

(Continued)

OTHER PUBLICATIONS

Bluethgen et al., Finding the optimum partitioning for multi-standard radio systems, International SDR Technical Conference, Nov. 2005.

(Continued)

*Primary Examiner* — Leon-Viet Nguyen
(74) *Attorney, Agent, or Firm* — Knobbe Martens Olson & Bear LLP

(57) ABSTRACT

A digital receiver is disclosed. In one aspect, the receiver includes a receiving module for receiving packetized data. The receive may further include a first processing module for packet detection having a first programmable processor. The receiver may further include a second processing module for demodulation and packet decoding having a second programmable processor. The receiver may further include a first digital receive controller having a third processor arranged for being notified of detection of data by the first processing module and for activating the second processing module.

35 Claims, 3 Drawing Sheets

(56) References Cited

FOREIGN PATENT DOCUMENTS

| EP | 1750376 | * | 2/2007 | ............... | H04B 1/38 |
| EP | 1750376 A1 | | 2/2007 | | |
| EP | 1750376 A1 | * | 2/2007 | ............... | H04B 1/38 |
| WO | WO-0111789 A2 | * | 2/2001 | | |
| WO | WO 0111789 A2 | | 2/2001 | | |
| WO | WO 2005/122414 A | | 12/2005 | | |

OTHER PUBLICATIONS

Bluethgen et al., A programmable platform for software-defined radio, System-on-Chip 2003, Proceedings of International Symposium, Nov. 2003, IEEE, Piscataway, NJ.

Konig et al., Following the software-radio-idea in the design concept of base stations—possibilities and limitations, Annals of telecommunications, Jul. 2002, vol. 57, No. 7/8, pp. 613-625, Get Lavoisier, Paris, France.

Kountouris et al., A reconfigurable radio case study: a software based multi-standard transceiver for UMTS, GSM, Edge, and Bluetooth, IEEE 54$^{th}$ Vehicular Technology Conference, Oct. 2001, vol. 1 of 4, Conf. 54, IEEE, New York, NY.

International Preliminary Report on Patentability dated May 26, 2008 for PCT/EP2007/054770.

European Search Report dated Jun. 18, 2007 for EP Application 06122533 (EP Publication No. 1914900A1 published Apr. 23, 2008).

* cited by examiner

DIGITAL RECEIVER FOR REACTIVE RADIO

CROSS REFERENCE TO RELATED APPLICATIONS

This application is a continuation of U.S. patent application Ser. No. 12/271,665, filed Nov. 14, 2008, titled "DIGITAL RECEIVER FOR REACTIVE RADIO," which application is a continuation of PCT Application No. PCT/EP2007/54770, filed May 16, 2007. Each of the above applications is incorporated by reference hereby in its entirety.

BACKGROUND OF THE INVENTION

1. Field of the Invention

The present invention relates to a digital receiver structure suitable for a software-defined radio platform.

2. Brief Description of the Related Technology

Software-defined radio (SDR) is a collection of hardware and software technologies that enable reconfigurable system architectures for wireless networks and user terminals. SDR provides an efficient and comparatively inexpensive solution to the problem of building multi-mode, multi-band, multi-functional wireless devices that can be adapted, updated or enhanced by using software upgrades. As such, SDR can be considered an enabling technology that is applicable across a wide range of areas within the wireless community.

Handheld digital receiver cost reduction and time-to-market improvement call for software defined radio (SDR) implementation. To be viable in portable handheld devices, SDR needs to be low power. SDR low cost and low power requirements implies:

reactive multi-mode operations: the receiver should be able to be configured to detect, possibly concurrently, transmission according to a multitude of communication standards. When those transmissions are detected, they must be decoded.

scalability: multiple versions of the platform, matching demand and silicon process technology evolution, must be derived from an initial, scalable design.

programmability and retargetability: the development time to deploy an application based on a SDR platform must be minimized. This is only possible by implementing integrated platform-instantiation and application-mapping flows based on high-level languages.

As programmability and energy efficiency must be carefully traded off to maintain energy efficiency at the level required for mobile device integration, programmability may only be introduced where its impact on the total average power is sufficiently low or at those places where the resulting extra flexibility can be exploited to yield an average energy gain through better matching of the system behavior to the utilization and the environment.

State-of-the-art solutions tackle multiple standards and future-proof SDR platforms with e.g.:

master-slave general purpose processor (GPP)—digital signal processing (DSP) with multiple radio interface, single or homogeneous multi-core System on Chip (SoC), Power consumption is tackled at computer architecture and/or circuit level, but not at system level (except for dynamic power management).

Many different architecture styles have already been proposed for SDR. Most of these are designed keeping in mind the most important characteristics of wireless physical layer processing: high data level parallelism (DLP) and data flow dominance. For the first characteristic, hybrid VLIW (Very Long Instruction Word) and vector/SIMD (Single Instruction/Multiple Data) architectures are often considered to exploit the data level parallelism with limited instruction fetching overhead. However, directly mapping C-code, even with high DLP, on such architectures remains a challenge for the compiler. The second characteristic is exploited by fine-grain reconfigurable arrays (FGA) and coarse grain reconfigurable arrays (CGA). The main bottleneck of the FGAs is the high interconnect cost that hampers their scalability and that yields significant energy overhead. CGAs improve on this point proposing less but more complex functional units.

Although several proposals (see e.g. also *'Finding the optimum partitioning for multi-standard radio systems'*, Bluethgen, Proc. Int'l SDR Technical Conference, November 2005) have contributed significantly to the integration of SDR in personal communication handhelds, none of the proposed platforms has the required features to enable reactive radio. Specifically, no solution has been proposed for multi-mode reactivity. Also their computing power at reasonable energy-efficiency is still too limited to exploit multiple signalling dimensions. This is mainly due to the fact that only the characteristics of the modulation/demodulation baseband processing are considered. In practice, a radio standard implementation also contains functionalities for medium access control and, in case of burst-based communication, signal detection and time synchronization. The desired characteristic of data level parallelism (DLP) does not hold for medium access control (MAC) processing which is, by definition, control dominated and, hence, better fits on RISC processors. Besides, packet detection and coarse time synchronization of burst-based transmission have a significantly higher duty cycle than packet modulation and demodulation. They hence require another flexibility/efficiency trade-off.

One possible application of such a reactive digital receiver relates to a mechanism for a hand-over operation between two base stations or access points of a mobile terminal comprising such receiver. The base stations are each arranged to cover a particular coverage area or cell. The coverage areas are partly overlapping, such that the arrangement supports a cellular network.

A hand-over can be a hard hand-over whereby the mobile terminal is (physically) connected to only one base station at a time, so that the connection to the current base-station must be terminated before the connection to the new base-station can be achieved. This implies an unconnected period (a "break") during the hand-over. The hard hand-over is also referred to as "break-before-make". On the contrary, a soft hand-over is a hand-over mechanism where the mobile terminal can be connected to two base-stations at the same time. This is also called "make-before-break".

With seamless hand-over is meant a hand-over going by unnoticed from a user perspective, i.e. without interruption of ongoing services. Seamless hand-over does not necessarily imply soft-handover (though soft-handover makes seamless handover easier).

Soft handover is possible between two 3G base stations operating at the same frequency and distinguished by two different CDMA scrambling codes. In the 3G cellular systems, a scrambling code, associated to each base station, is super-imposed to the usual CDMA code that separates the mobile terminals. One mobile terminal can make use of the scrambling codes to receive the signals of two base stations simultaneously with a single front-end.

Seamless hard handover can be achieved through synchronization of the base stations. Based on this synchronization the base station allows the terminal to scan neighboring cells during a limited time and if needed it triggers a hard handover that can happen relatively fast. This technique is not possible for hard hand-over between different network technologies on one hand, and requires complex network synchronization for a single network on the other hand.

For 802.11 wireless LAN, there is the possibility of connecting one terminal to multiple access points at the same time, through a time division scheme using the power save mechanism provided by the 802.11 protocol. This technique is useful for protocols and applications where the protocol provides a power-save feature with a time constant smaller than the latency bound of the application.

In EPO patent application EP1328066-A2 a semiconductor device is disclosed that is functionally divided into blocks. The power supply systems of the blocks are divided into a non-controlled power supply group in which power is always on and a cascade of controlled power supply groups in each of which groups a supply of power can be turned on/off independently, but in a chained way. This means that the power of a given block is controlled by the predeceasing block in the cascade. The blocks that are not necessary for performing a specific piece of processing are not supplied with power. For example, the decoding block is only switched on when the processing in the preceding demodulation block has been done. The division into various blocks is purely functional and does not take into account any consideration regarding the actual static or dynamic power of the blocks, their duty cycle, nor their trade-off between energy efficiency and flexibility. By construction, the higher the hierarchical level of a block, the higher the duty cycle is.

U.S. Pat. No. 6,978,149-B1 relates to a transceiver the receiver part of which is switchable between a sleep mode and an active mode. A control circuit is provided for switching the receiver from sleep mode to the active mode when an information signal to be received is detected. The control circuit takes a decision to switch based on a power level of the information signal, the power level being represented by a received signal strength indicator (RSSI) signal. Here again, a cascaded activation chain is foreseen, with a purely functional partitioning.

It is desirable to have a scalable, energy-efficient digital receiver structure enabling spectrum environment awareness and gradual system wake-up in response to incoming radio transmissions.

SUMMARY OF CERTAIN INVENTIVE ASPECTS

Certain inventive aspects relate to a digital receiver comprising
a receiving module for receiving packetized data,
a first processing module for packet detection comprising a first programmable processor,
a second processing module for demodulation and packet decoding comprising a second programmable processor,
a digital receive controller comprising a third processor arranged for being notified of data availability by the first processing module and for activating the second processing module.

In a preferred embodiment the receiving module for receiving packetized data is an analog front end.

Advantageously, in use, the power consumption of the first processor is lower than the power consumption of the second processor. In use, the flexibility of the first processing module is lower than the flexibility of the second processing module. Specifically, the instruction set of the second processing module is richer and allows usage of high-level language compilers.

Preferably the first processor is an application specific instruction set processor. On the other hand, the second processor advantageously is a general purpose processor.

In a preferred embodiment the first processing module comprises a third processing module for power level detection and a fourth processing module for synchronization. The fourth processing module comprising the first processor.

The third processing module is arranged for being fed with packetized data from the receiving module for receiving packetized data. The third processing module is preferably a hardware block.

The digital receiver may further comprise a second controller for the first processing module, the second controller being arranged for receiving at its input notification of power detection from the third processing module and arranged for activating the fourth processing module. The fourth processing module is typically arranged for receiving control signals from the second controller. It further receives data packets from the receiving module for receiving packetized data via a filtering unit. The second controller is a configurable hardware block. Advantageously the third processing module is arranged for providing settings for the receiving module for receiving packetized data. The first processor (in the fourth processing module) is preferably optimized for correlation.

In another preferred embodiment the digital receiver comprises a plurality of the first processing modules, which advantageously have a same architecture. Preferably at least some of the first processing modules are arranged for sharing a same bus interface. The receiver may then further comprise a plurality of receiving modules for receiving packetized data. Each receiving module for receiving packetized data is then preferably connected to a corresponding antenna.

In another embodiment, the digital receiver comprises a plurality of the second processing modules, having a general purpose architecture or an architecture dedicated to specific subparts of the demodulation/decoding.

The digital receiver is arranged for operating in different modes, each of the first processing modules being programmable for operating in one of the modes.

In another embodiment the first processing modules share the second controller. Alternatively, each of the first processing modules has its own second controller.

Preferably the fourth processing module is arranged for filtering and further comprises a first memory for buffering data packets. The first memory is preferably a circular data buffer. Advantageously, the fourth processing module is further arranged for performing the filtering operation on a configurable hardware block.

In a further embodiment the digital receiver further comprises a second memory for data reception, in parallel to the first memory. The receiver may further comprise transfer module for data transfer between the first or the second memory on the one hand and memory of the second processor on the other hand. The transfer module for data transfer preferably comprises a bus and a direct memory access. The bus preferably is a shared bus. Optionally a plurality of busses can be provided, as well as a plurality of direct memory accesses.

In another embodiment the digital receiver further comprises a FEC coder arranged for being fed with data from the second processing module, the FEC coder being arranged for being activated by the first digital receive controller.

In a preferred embodiment the digital receiver as previously described is arranged for processing signals according to any standard of the following: IEEE802.11a, IEEE802.11n, 3GPP-LTE, IEEE802.16e.

Another aspect relates to the use of a mobile terminal comprising a digital receiver as described for establishing a soft hand-over between two base stations of a wireless communication system.

In another aspect, a digital receiver is disclosed. The receiver comprises a receiving module for receiving packetized data, a first processing module for packet detection comprising a first programmable processor, a second processing module for demodulation and packet decoding comprising a second programmable processor, and a first digital receive controller comprising a third processor arranged for being notified of detection of data by the first processing module and for activating the second processing module.

In another aspect, a digital receiver is disclosed. The receiver comprises means for receiving packetized data. The receiver further comprises means for packet detecting, the detecting means being programmable. The receiver further comprises means for demodulating and packet decoding, the demodulating and decoding means being programmable. The receiver further comprises means for being notified of detection of data by the detecting means and for activating the second processing module.

DETAILED DESCRIPTION OF CERTAIN ILLUSTRATIVE EMBODIMENTS

In the approach according to one embodiment the power consumption is taken into account from a system perspective. More specifically, it employs a partitioning selected for obtaining predetermined performance in terms of flexibility and power consumption and hierarchical activation with aggressive power management. Such opportunistic partitioning aims at providing flexibility where and when it is needed. Such targeted flexibility calls for heterogeneous multi-processor system-on-chip (MPSOC) architectures. The main idea behind hierarchical activation is to gradually enable increasingly power-consuming parts of the platform to perform a sequence of tasks with increased capability to detect the signal. The gradual wake up capitalizes on a cascade of functional blocks that are implemented with a monotonically increasing flexibility and hereby decreasing energy efficiency, which is compensated by the decreasing duty cycle obtained by construction.

With platform is meant the framework on which applications may be run. This comprises a hardware platform system-on-chip (SoC), hardware abstraction layer software, tools to get application software mapped on the platform system-on-chip (SoC) and possibly application software libraries. In the following the focus is on the HW platform SoC.

Parts of the application that have low duty cycle can be grouped together to be mapped to highly flexible hardware. The cost of flexibility is then well amortized by implementing the aggressive power management exploiting the low duty cycle. For parts having a higher duty cycle and therefore a higher impact on the average power, less flexible application-specific hardware are required. Parametrizable hardware blocks or multiple specialized cores are pragmatic solutions. Within the part to be targeted to programmable/reconfigurable hardware, a sub-partition can be achieved between control-dominated tasks (low number of operations per control branch) and computation- and/or transfer-dominated tasks. The former are later targeted to scalar micro-architecture, the latter being candidate for instruction-level parallel micro-architecture. Finally, the degree of data level parallelism and the operation per memory ratio are used to decide if multiple flavors of those architectures must be considered simultaneously. From this partitioning, one can extract the top-level platform architecture defining the number and type of cores.

Figure 1:
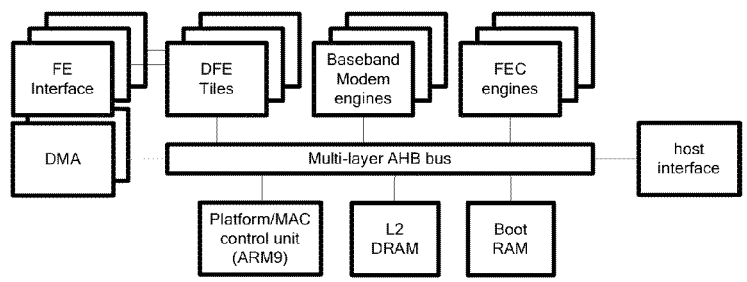
FIG. 1 represents a top level view of the platform architecture.

The digital receiver can be subdivided in a number of building blocks. FIG. 1 depicts a top level view of the considered platform template. The high level platform architecture may comprise various cores: multiple digital front-end cores assigned to signal detection and interfacing with analog front-end, multiple baseband engines assigned to signal modulation/demodulation and multiple antenna processing, outer modem tiles assigned to FEC coding/decoding and a core for platform control and medium access control.

A digital front-end associated to the analog front-end is provided for radio signal scanning, analog front-end steering (e.g. automatic gain control (AGC)), short-loop analog front-end control, I/Q sample interfacing, packet detection, decimation and burst pre-synchronization in receive mode and signal interpolation in transmit mode. Those functions are characterized by a relatively high duty cycle. The DFE power is therefore critical.

The remaining modem functionalities are split into two groups. Baseband digital signal processing units implement receive functions relative to fine synchronization, front-end impairment compensation, multi-antenna processing and demodulation. In transmit mode, channel encoding and modulation are implemented on the baseband units too. The considered processor architecture is based on a hybrid SIMD-CGA approach. Forward error correction engines accelerate the data (de)coding from the (de)multiplexed streams (outer modem). The former is computing-intensive, with high data-level parallelism and is dominated by saturated fixed-point complex number manipulations. The baseband processor architecture can be one with multiple baseband cores. The architecture may comprise programmable and/or reconfigurable hardware blocks, possibly containing a plurality of (parallel) cores. A scalable interconnect may be provided between the various cores. The interconnect may be a segmented bus interconnect (see next paragraph for more details). The second group of functionalities is transfer-intensive and often requires special arithmetic. Both have reasonably low duty-cycle in application scenarios. Finally, medium access control (MAC) and cognitive control processing are both transfer- and control-dominated with low duty cycle. They hence form a fourth partition. The platform control and media access control can be carried by a general purpose core (e.g. an ARMS processor).

Figure 2A:
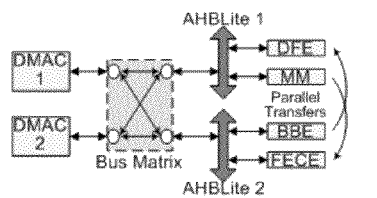
FIG. 2 represents a top level view of the platform architecture.
Figure 2B:
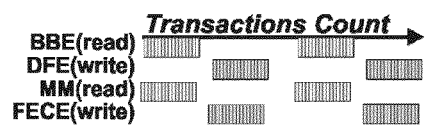

As already mentioned, the scalable interconnect (see FIG. 1) may advantageously be a segmented bus interconnect. FIG. 2A shows a possible implementation. The segmented bus architecture comprises two single-port direct memory access controllers (DMAC) with an adjustable FIFO depth. Note that in FIG. 2 MM means main memory, DFE digital front-end, BBE baseband engine and FECE forward error correction engine. A burst length of 16-word gives a reasonable trade-off between throughput and latency as the increased burst length introduces extra delay for the access of the lower priority transfer. As both DMACs need to have access to the bus segments to perform back to back parallel data transfers, a suitable bus connectivity must be provided. A multi-layer AHB bus (Amba High Performance Bus) as shown in FIG. 2A is provided. The concurrency of multiple 16-word burst transfers between the two segments is shown in FIG. 2B. The throughput of the segmented bus of FIG. 2A can amount to 4.3 Gbit/s, which is sufficient for e.g. IEEE802.11n processing. The bus utilization may amount up to more than 50%, preferably to more than 60% and even more preferably to more than 65%. For completeness it is recalled that a transaction on a AHB bus consists of an address phase and a subsequent data phase (without wait states: only two bus-cycles). Access to the target device is controlled through a multiplexer (non-tristate), thereby admitting bus access to one bus-master access at a time. The AHB bus allows (among other features) for burst transfers, pipelined operations, several bus masters, single-cycle bus master handover, non-tristate implementation and large bus-widths (64/128 bit).

Programmable solutions intrinsically suffer from higher power consumption when compared to dedicated solutions. In the proposed platform, the scalable digital front-end comprises multiple 'tiles', which, as already mentioned, implement signal detection and pre-synchronization functions. These multiple tiles require both very high energy efficiency and sufficient programmability to implement detection of different standards on the same tile. The digital front-end of the scalable, energy-efficient digital receiver has a flexible detection/time synchronizer unit allowing for major savings in the average power consumption of the platform by supporting a gradual wake-up of the system in response to incoming radio transmissions.

In general terms the digital front-end is the part of the system that:
  proceeds to the tasks needed in stand-by mode while the rest of the platform is shut off, namely signal detection and/or scanning,
  generates the interrupts to wake up the platform if one or several signals are detected,
  buffers the received rough data during the wake-up sequence of the platform,
  ensures automatic gain control (AGC), RX filtering, and coarse synchronization when one or several stream(s) is(are) received,
  ensures TX filtering if one or several streams are transmitted.

The digital front-end (DFE) is the signal entry/exit point of the reactive radio platform. It is connected to one or multiple RF front-end/antenna sections via an analog front-end. To minimize its overall power consumption its flexibility is kept to a minimum. Commonalities between most digital radio schemes are exploited to derive a generic architecture. Due to the versatility of synchronization algorithms across digital radio standards, flexibility is still required for the synchronization section. An application specific processor with specific support for autocorrelation and crosscorrelation is considered.

Figure 3:
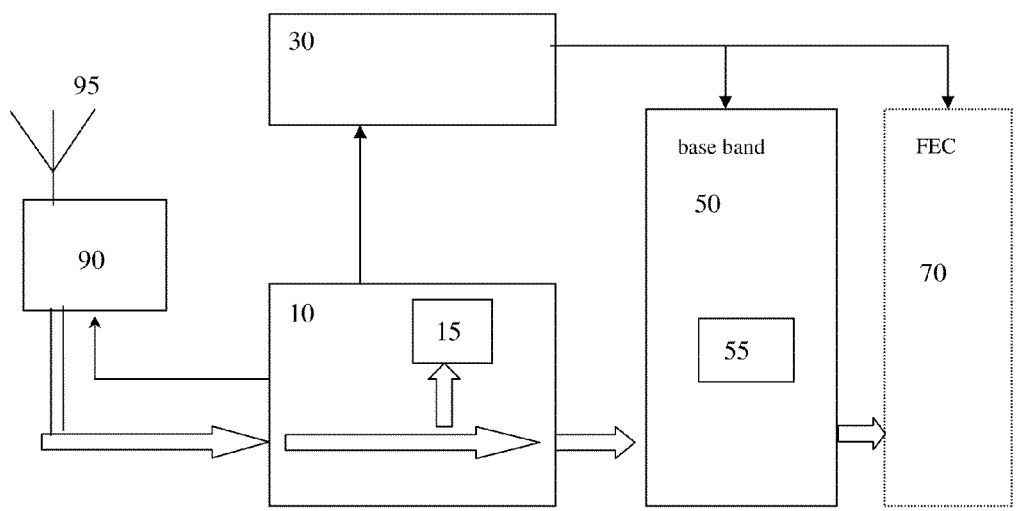
FIG. 3 represents a general overview of the architecture of a digital receiver according to one embodiment.
Figure 4:
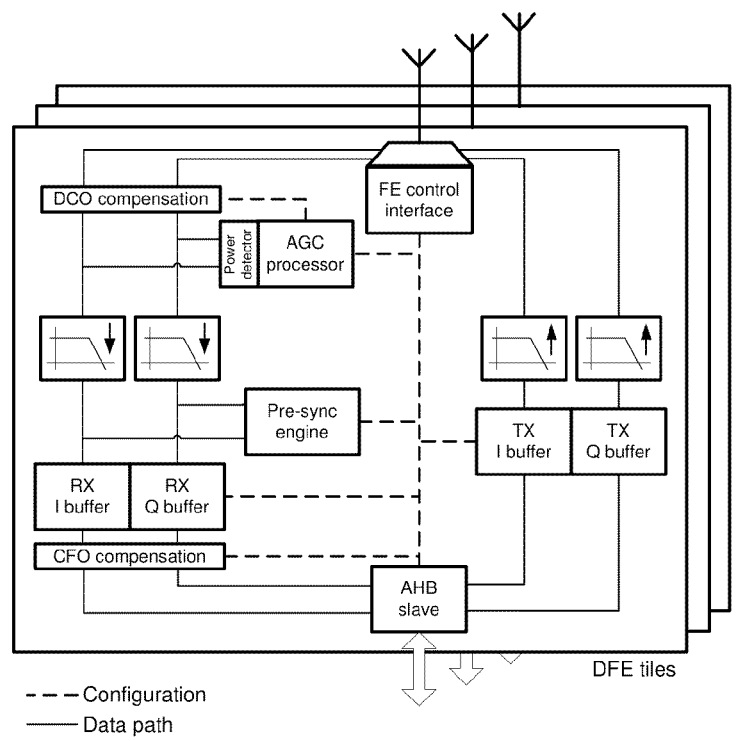
FIG. 4 represents a practical implementation of a DFE tile.

FIG. 3 presents a generic overview of the digital front-end architecture for one detector tile (corresponding to one antenna). FIG. 4 shows an example of a possible practical implementation. A single tile contains the digital receive and transmit logic to interface to a single antenna.

Incoming packetized data are input to a first processing module (10) (this term is used in this description as a synonym for 'detector tile'). This first processing module (10) is in connection with an antenna section (95) via an analog front-end (90). Data detection by the first processing module is signalled to a digital receive controller (30). This controller (30) is arranged for copying the available data from the first processing module memory towards a second processing module memory and activating a second processing module (50), which takes care of demodulating and decoding the packets of data. The detector tile (10) comprises a first processor (15), preferably an application specific instruction set processor (ASIP). The second processing module (50) comprises a second processor (55), typically a general purpose processor. It is to be noted that the data flow does not pass through the controller (30). Data copy is done by direct memory access over the system bus.

The transmitter part of a DFE tile includes or consists of a buffer and a VLSI interpolation filter. A start command can be issued allowing the samples to be clocked out towards the analog front-end through the filters. The transmit (TX) buffers (see FIG. 4) have a programmable threshold that triggers an interrupt once the number of available samples falls below this threshold. This interrupt is handled by the platform controller.

The receiver part of the DFE tile in FIG. 4 contains a chain made of the VLSI decimation filters, the buffers and compensation units for DC offset and carrier frequency offset (CFO). Next to the data path, two dedicated micro-processor cores are implemented. The first handles the front-end automatic gain control (AGC) and the DFE power management. The second core is optimized for time synchronization.

Figure 5:
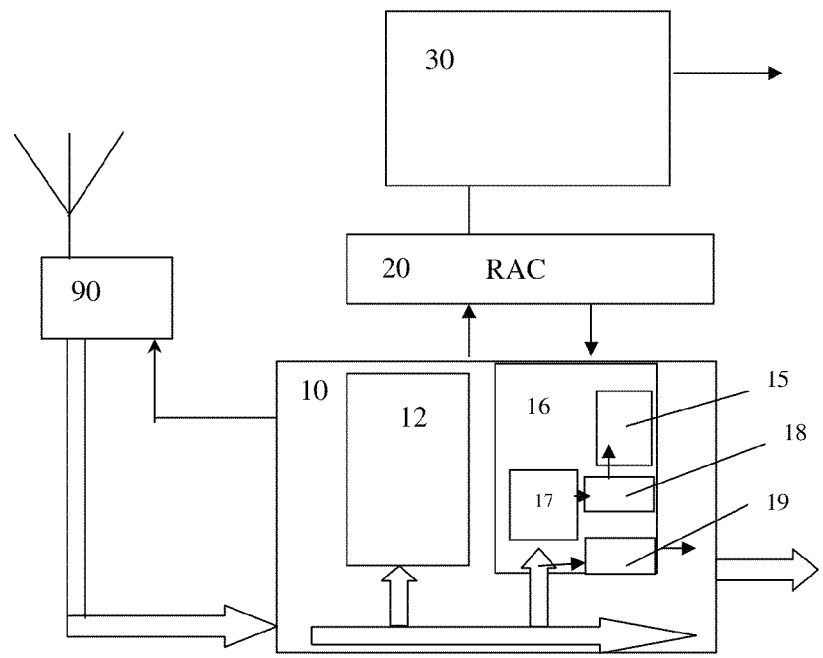
FIG. 5 represents the same architecture as in FIG. 3, with a detailed view on block (10).

FIG. 5 shows a more detailed view on the architecture. The data path of the DFE from a certain antenna is such that the unfiltered samples in the data packets are analyzed by a third processing module (12). This is typically an AGC controller that will calculate the correct settings for the front-end (filters etc. . . . ). The third processing module is implemented as a hardware block.

In a preferred embodiment the digital receiver further comprises a resource activity controller (20) for the first processing module (10) to which the detection of power by the third processing module and/or the success of data synchronization by the fourth processing module are signalled. The resource activity controller (20) controls which parts of the DFE are activated at a certain point in time, based on the inputs provided by those different blocks to support gradual wakeup of the platform. The controller (20) may be a configurable hardware block. The resource activity controller (20) is capable of activating a fourth processing module (16) and of generating a message to wake-up the digital receive controller. This fourth processing module (16) also belongs to the first processing module (10). In one embodiment this fourth processing module (16) does not receive input from the third processing module (12). The data paths in the third (12) and the fourth (16) processing modules are in parallel.

It is this fourth processing module (16) that receives control signals from the second controller (20). The fourth processing module (16) also receives data packets from the receiving module of receiving packetized data. The fourth processing module (16) comprises the first processor (15). It also comprises a filtering module (17). The output of the receive filters (17) is stored in a data buffer (18). This is necessary, as the data needs to be buffered while the first processor (15) performs the coarse synchronization algorithm on the filtered samples. The processor (15) can be connected to the data buffer or to a replica of this data buffer, depending on the implementation choices. Further, there is the connection from the data buffer to the main data bus through a system bus interface.

In one embodiment of the invention the described data path is duplicated as many times as there are antennas in the system, each antenna having its own receiving module (90) for receiving packetized data, preferably being an analog front-end as already mentioned. Each tile (first processor module 10) may then have the same architecture. The multiple detection tiles allow a flexible support for MIMO reception and/or multi-mode scanning. The detection can then be performed simultaneously for different modes. Flexible time synchronization is performed in the first processor in each tile. The tile configuration and (hierarchical) activation can be performed by a shared global resource activity controller (20). Alternatively, a dedicated resource activity controller can be provided for each tile separately.

In such an embodiment with a plurality of detection tiles the digital receiver can be configured for operating in different modes, whereby each detection is programmed for operating in one of the possible modes.

The digital receiver system is made up of a processing hierarchy (including the DFE units and the baseband processors) and a control hierarchy (made of one or several DFE/resource activity controller(s)). The data may flow straight from the input interface to downsampler/anti-aliasing filter to the circular buffer and synchronization processor scratch path and then, depending on synchro pointer to the baseband processor memory. The data does not flow to the platform controller, nor to the AGC, nor to the resource activity controller.

The blocks of the third and fourth processing module are now described more in detail.

The basic idea of the architecture is to keep the main data path as straight-through as possible. This means that it should be possible to pass the input samples that come out of the receive filter (17) to the rest of the system without requiring explicit action from the first processor (15). The proposed architecture takes this into account.

The purpose of the AGC controller is to steer the amplification of the front-end and to detect a possible incoming signal. In case of certain working modes the AGC controller needs to be by-passed, since signal detection will only be possible after e.g. a coarse synchronization operation or a despreading operation. The default working mode of the third processing module (12) can be detailed as follows. When the AGC is in free-running mode (default mode on start-up), it starts measuring power and steers the front-end amplification chain to reach a maximum SNR. The amplification table (optimal gain distribution) is depending on the front-end used. The power measurement is performed in multiple steps. Normally there is a power exploration performed followed by fine power estimation. The power estimation itself is an averaging over the incoming samples. When the incoming power reaches a certain threshold, the AGC controller will signal this, enabling a time synchronization. During this time, the AGC is put in hold mode, allowing the time synchronization in the fourth processing module (16) to find a possible start of packet. If the time synchronization doesn't find a start of packet, or when the packet transmission has ended, the AGC will go into free-running mode again. The AGC release signal can come from a failed time synchronization or an end of packet.

The receive anti-aliasing filters (17) perform the downsampling on the incoming signal. They are heavily power-optimized.

The first processor (15) is preferably an application specific instruction set processor (ASIP), as previously explained. The so-called synchronization processor (i.e. the first processor) is provided with the filtered data samples that have to be analyzed to determine the coarse synchronization point. The synchronization processor starts its synchronization search on the incoming data in reaction to an ACG lock event. Once it detects a valid synchronization sequence, it interrupts the host controller and passes the start address of the data in the circular buffer to the platform controller. The controller can subsequently start burst transfers of data from the circular buffer through the bus slave interface to the other base band processing parts of the system.

Figure 6:
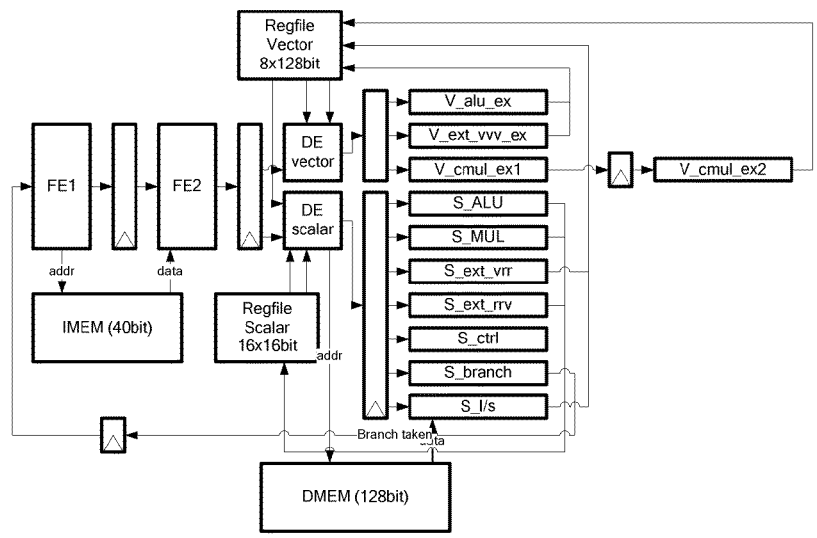
FIG. 6 represents a possible ASIP architecture for the first processor.

FIG. 6 shows a possible architecture of such an ASIP for performing coarse time synchronization. It has a two-issue VLIW architecture. Besides the traditional Arithmetic Logic Unit (ALU), pipelined complex number arithmetic multiplier (MUL), control (CTRL), branching (BRANCH), load and store (L/S) functional units, are present. Besides, three specific units are added to implement explicit register move and vector packing/unpacking. They are specifically: V_ext_v-vv_ex, packing two vectors together; S_ext_vrr, unpacking a vector into scalar registers; S_ext_rrv, packing scalars into a vector.

The resource activity controller (RAC) controls what parts of the DFE receive path are activated at each point in time. It is a register configurable hardware block. The RAC takes decisions based on the input signals generated by the AGC controller, the synchronization processor and the platform controller. When e.g. a certain AGC asserts the RX enable signal, the RAC will activate the filter, buffer, and ASIP clock for the corresponding detector tile. Exceptions to this behavior are when operating modes are selected where the ASIP first needs to run a certain algorithm. In this case the complete detector tile is activated, regardless of the status of the AGC. The RAC furthermore take care of releasing the AGC from hold mode. It therefore depends on information generated by the synchronization processor (in case of a false AGC trigger), or the digital receive controller (in case of an 'end of packet').

One possible way to perform the (de)activation is to use clock gating and memory substrate biasing in sleep mode. The activation first restores nominal bias to the memories (so that they can be accessed at normal speed at cost of leakage). Then the core is clocked again. For processors, a small wake-up block (always clocked) catches the wake-up signal for the wake up process. Processors can deactivate themselves by a specific instruction.

The bus interface provides the digital receive controller with access to the data buffers of the different detector tiles. Through the interface, the controller can perform burst data transfers from the data buffers to the rest of the system.

The default working principle of the DFE RX subsystem is the following:

The AGC controller monitors the output of the front-end. The downsampler/filter is not activated so the data is blocked. If it detects a possible incoming signal, it notifies the RAC of this event.

The RAC enables the receiver filters, the circular data buffer and the synchronization processor. The latter will start looking for synchronization or correlation sequence, depending on the selected working mode. The synchronization processor hereby looks for a data preamble (start of a packet) in its memory, which is in sync with the circular buffer.

If the ASIP decides that valid information is present in the data buffer, it interrupts the platform controller and passes the correct start address of the data in the circular buffer to the controller.

The controller can then initiate a transfer from the circular buffer through the bus interface to whatever part of the FLAI platform that can process the data. The synchronization processor does not need to take any action in this. For example, the controller can copy the data from the DFE buffer to the baseband processor memory, wake up the baseband processor and instruct it about which functions have to be carried out. When the baseband processor has finished, it notifies the platform controller that the data can be copied to the FEC processor memory and wake-up/notify the latter. Note that by 'copying' is not meant that the data flows through it. It is in fact based on direct memory access.

The detection tiles, except the AGC controller, can independently be set in sleep mode when no signal is detected by the AGC.

As already mentioned, the digital receiver as disclosed above may be arranged for processing signals according to various standards, like e.g. IEEE802.11a, IEEE802.11n, 3GPP-LTE, IEEE802.16e.

Figure 7:
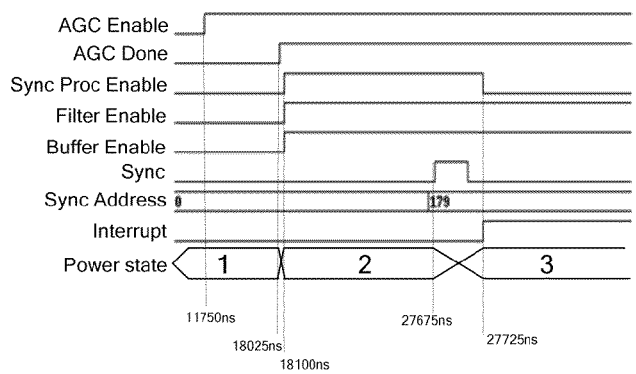
FIG. 7 represents an activity trace when detecting a valid burst.

As an example, FIG. 7 illustrates the sequence of operations required to guarantee the detection and pre-synchronization of a valid burst for the 802.11a case. The AGC_enable signal is high when the DFE tile is active. The AGC controller is continuously analyzing the incoming data. Power detection is signalled by AGC_done (on time index 18025 ns in the example shown). This yields the assertion of the sync_enable, filter_enable and buffer_enable signals that activate respectively the synchronization processor, the decimation filters and the data FIFO. For the considered input signal, a synchronization event occurs at time index 27675 (sync) signal. This causes the assertion of a platform level interrupt (DFE_int), which wakes up the platform controller. The power state flow is appended to FIG. 7. Summing up the state power multiplied by the state duration, one can easily compute the energy consumed during the burst detection. Specifically, we consider the energy spent between the reception of the first valid sample until the generation of the DFE_int interrupt. In the current experiment, this gives 228 nJ.

Figure 8:
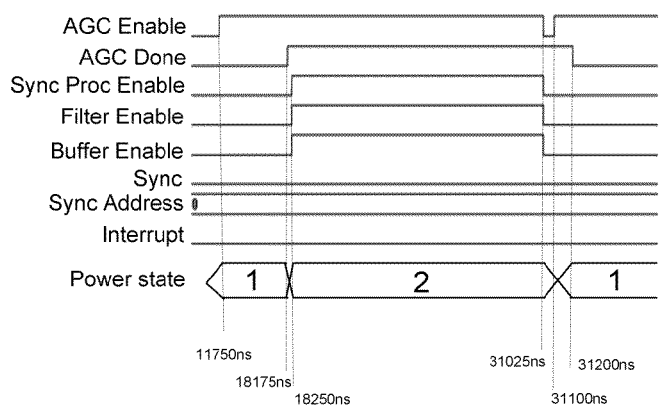
FIG. 8 represents an activity trace when detecting a false trigger.

Similarly, the sequence of operation occurring at the reception of a blocker signal (false trigger) is depicted in FIG. 8. Although an AGC_done signal is generated and the filter, buffer and synchronization processor are activated, no synchronization point is found and hence, the 'sync' signal is not asserted. Filter, buffer and synchronization processor are forced back to sleep mode after a time-out occurs at time index 31025 ns. The state flow is again appended to FIG. 8 and the energy spent in the false trigger event is computed similarly, giving 300 nJ. The average power during the false trigger event is 15.2 mW. Therefore, in field operation where false trigger occurs with probability p, the consumption of the DFE tile would hence be $1.1(1-p)+15.2p$ mW.

The attention is now drawn to the design of the platform System-on-Chip. The cores micro-architecture and interconnect being known, an Electronic System Level (ESL) platform model based on instruction-set simulators, cycle-accurate interconnect models and behavioral models for the parametrizable cores can be assembled. It is used as reference for the development and integration of the SDR software and partly as test bench for the gradual refinement of the platform hardware. Software and hardware development can then be decoupled.

The virtual platform design is a key step in the high level methodology design flow. It aims at assembling a platform simulator at a level of abstraction fitting both for software development (platform control API, functional physical layer, functional medium access control and data link API) and as reference for platform hardware design. Translation between different levels of abstraction is done via so-called transactors. This enables executable models with parts at different level of abstraction. The development of the virtual platform mainly consists of the development of the IP core models, the optimization of the interconnection and execution control/handshaking subsystems and the platform model integration. A significant part of the platform integration is the determination of the memory map.

By way of example, a particular application wherein the digital receiver as described herein can advantageously be used, is now given. The application relates to a case of a seamless hand-over of a mobile terminal with two or more antennas between two base stations or access points not synchronized in time and operating at a different frequency (with identical standards or not). The base stations may advantageously apply Multiple Input-Multiple Output (MIMO) communication schemes that possibly support high mobility of the terminal.

The proposed solution enables seamless hand-over between two base stations of a different network technology (inter-mode handover) as well as between two base stations operating in the same standard but using different carrier frequencies.

As the digital receiver structure as presented above enables a flexible allocation of resources (antennas+analog front-ends) to different communication modes, it allows optimizing the overall communication performance according to the user needs/communication conditions, provided that a smart controller leads the resource allocation. One of the antennas of the mobile terminal can be used to scan and initiate association to the new base station, while other antennas are still used to communicate with the current base station, thus enabling soft handover. The quickly switchable and/or reconfigurable blocks in the receiver support communication whereby the terminal antennas are exploited for communication with at least one antenna less in case at least one antenna is used for hand-over scanning.

In order to switch from a dual-antenna operation to a single antenna operation in one network, the base station should be informed of the reduced capacity/reliability of the link. For example, spatially multiplexed streams could not be supported anymore, the constellation and/or coding rate could be changed to ensure a given communication quality.

The application of the digital receiver of the foregoing embodiments for a soft hand-over application illustrates the beneficial effect whereby the same hardware blocks can be reused.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A digital receiver, comprising:
a receiving module for receiving packetized data;
a first processing module for packet detection comprising a first programmable processor;
a second processing module for demodulation and packet decoding comprising a second programmable processor;
a first digital receive controller comprising a third processor arranged for activating the second processing module upon being notified of detection of data by the first processing module; and
a second controller for the first processing module, wherein the first processing module comprises a third processing module for power level detection and a fourth processing module for synchronization, the fourth processing module comprising the first programmable processor, and wherein the second controller is arranged to receive input from the third processing module and to gradually activate the fourth processing module based on the input received from the third processing module.

2. The digital receiver as in claim 1, wherein the receiving module for receiving packetized data is an analog front end.

3. The digital receiver as in claim 1, wherein, in use, the power consumption of the first processor is lower than the power consumption of the second processor.

4. The digital receiver as in claim 3, wherein, in use, the power consumption of the first processing module is lower than the power consumption of the second processing module.

5. The digital receiver as in claim 1, wherein the first processor is an application specific instruction set processor.

6. The digital receiver as in claim 1, wherein the second processor is a general purpose processor.

7. The digital receiver as in claim 1, wherein the third processing module is arranged for being fed with packetized data from the receiving module for receiving packetized data.

8. The digital receiver as in claim 1, wherein the third processing module is a hardware block.

9. The digital receiver as in claim 1, wherein the fourth processing module is arranged for receiving control signals from the second controller.

10. The digital receiver as in claim 1, wherein the second controller is a configurable hardware block.

11. The digital receiver as in claim 1, wherein the third processing module is arranged for providing settings for the receiving module for receiving packetized data.

12. The digital receiver as in claim 1, wherein the first processor is optimized for correlation.

13. The digital receiver as in claim 1, wherein the receiver comprises a plurality of the first processing modules.

14. The digital receiver as in claim 13, wherein at least two of the plurality of the first processing modules are arranged for sharing a same bus interface.

15. The digital receiver as in claim 13, wherein the plurality of first processing modules have a same architecture.

16. The digital receiver as in claim 13, the receiver comprising a plurality of receiving modules for receiving packetized data.

17. The digital receiver as in claim 16, wherein each receiving module for receiving packetized data is connected to a corresponding antenna.

18. The digital receiver as in claim 13, the digital receiver being arranged for operating in different modes, each of the first processing modules being programmable for operating in one of the modes.

19. The digital receiver as in claim 13, wherein all of the first processing modules share the second controller.

20. The digital receiver as in claim 13, further comprising a second controller for each of the plurality of first processing modules.

21. The digital receiver as in claim 1, wherein the fourth processing module is arranged for filtering and further comprises a first memory for buffering data packets.

22. The digital receiver as in claim 21, wherein the fourth processing module is arranged for performing the filtering operation on a configurable hardware block.

23. The digital receiver as in claim 21, wherein the first memory is a circular data buffer.

24. The digital receiver as in claim 21, further comprising a second memory for data reception, in parallel to the first memory.

25. The digital receiver as in claim 24, further comprising a transfer module for data transfer between the first or the second memory on the one hand and memory of the second processor on the other hand.

26. The digital receiver as in claim 25, wherein the transfer module for data transfer comprises a bus and a direct memory access.

27. The digital receiver as in claim 26, wherein the bus is a shared bus.

28. The digital receiver as in claim 26, wherein the receiver comprises a plurality of buses.

29. The digital receiver as in claim 28, wherein the receiver comprises a plurality of direct memory accesses.

30. The digital receiver as in claim 1, further comprising a FEC coder arranged for being fed with data from the second processing module, the FEC coder being arranged for being activated by the first digital receive controller.

31. The digital receiver as in claim 1, wherein the receiver is arranged for processing signals according to one or more of the following group of standards: IEEE802.11a, IEEE802.11n, 3GPP-LTE, and IEEE802.16e.

32. Use of a mobile terminal comprising a digital receiver as in claim 1, for establishing a soft hand-over between two base stations of a wireless communication system.

33. A digital receiver comprising:
means for receiving packetized data;
means for packet detecting, the packet detecting means being programmable, the packet detecting means comprising means for detecting power level and means for time synchronization;
means for demodulating and packet decoding, the demodulating and decoding means being programmable;
means for activating the demodulating and decoding means upon being notified of detection of data by the packet detecting means; and
means for gradually activating the synchronization means based on an input from the power level detecting means.

34. The digital receiver as in claim 33, wherein the digital receiver comprises a plurality of packet detecting means, and wherein the digital receiver is arranged for operating in different modes, each of the packet detecting means being programmable for operating in one of the modes.

35. The digital receiver as in claim 1, wherein the receiving module is connected to an antenna and is configured to receive packetized data via the antenna.

\* \* \* \* \*